(12) United States Patent
Schmid

(10) Patent No.: US 6,510,691 B1
(45) Date of Patent: Jan. 28, 2003

(54) METHOD FOR REGULATING OR CONTROLLING A SUPERCHARGED INTERNAL COMBUSTION ENGINE

(75) Inventor: Wolfram Schmid, Nuertingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/806,089
(22) PCT Filed: Aug. 28, 1999
(86) PCT No.: PCT/EP99/06343
§ 371 (c)(1), (2), (4) Date: Jun. 27, 2001
(87) PCT Pub. No.: WO00/19070
PCT Pub. Date: Apr. 6, 2000

(30) Foreign Application Priority Data

Sep. 26, 1998 (DE) .......................................... 198 44 213

(51) Int. Cl.⁷ .............................................. F02D 23/00
(52) U.S. Cl. ........................................................ 60/602
(58) Field of Search ........................... 60/602, 603, 600, 60/601

(56) References Cited

U.S. PATENT DOCUMENTS

| | | | |
|---|---|---|---|
| 4,848,086 A | | 7/1989 | Inoue et al. .................. 60/602 |
| 5,031,406 A | * | 7/1991 | Akiyama ..................... 60/602 |
| 5,123,246 A | * | 6/1992 | Younessi et al. ............. 60/602 |
| 5,813,231 A | * | 9/1998 | Faletti et al. ................. 60/602 |
| 6,000,221 A | * | 12/1999 | Church et al. ................ 60/602 |
| 6,062,025 A | * | 5/2000 | Okada et al. ................. 60/602 |
| 6,085,526 A | * | 7/2000 | Bischoff ...................... 60/602 |
| 6,089,018 A | * | 7/2000 | Bischoff et al. .............. 60/602 |
| 6,272,859 B1 | * | 8/2001 | Barnes et al. ................ 60/602 |
| 2001/0032465 A1 | * | 10/2001 | Terry et al. ................... 60/602 |

FOREIGN PATENT DOCUMENTS

| | | | |
|---|---|---|---|
| DE | 40 25 901 | 1/1992 | .................. 60/602 |
| DE | 195 31 871 | 11/1996 | .................. 60/602 |
| EP | 0 323 253 A2 * | 7/1989 | .................. 60/602 |
| EP | 0 323 254 A2 * | 7/1989 | .................. 60/602 |
| EP | 0 323 255 A2 * | 7/1989 | .................. 60/602 |
| EP | 0 323 256 | 7/1989 | .................. 417/64 |
| EP | 0 323 754 A2 * | 7/1989 | .................. 60/602 |
| EP | 0 786 589 | 7/1997 | .................. 60/602 |

* cited by examiner

Primary Examiner—Thomas Denion
Assistant Examiner—Thai-Ba Trieu
(74) Attorney, Agent, or Firm—Crowell & Moring LLP

(57) ABSTRACT

In a method for the closed-loop or open-loop control of a forced-induction internal combustion engine that includes an exhaust turbocharger with an exhaust turbine with varible turbine geometry for the varible adjustment of the effective turbine cross section and with a boost-air compressor, different operating states of the engine are assigned different characterisitic maps with engine-operating and/or engine-state varibles and the turbine geometry is adjusted in accordance with the characteristic maps between an open position and a pressure build-up position. When there is a change in a significant engine parameter, the system switches between two characteristic maps.

To optimize the operating behaviour of the engine over all load and engine-speed ranges, two load/engine-speed ranges are defined above and below a specifiable limiting value and each load/engine-speed range is assigned a characteristic map, the current load/engine-speed range is identified by means of the engine parameter, in the lower load/engine-speed range adjustment of the variable turbine geometry is performed by means of open-loop control as a function of the characteristic map assigned to the lower load/engine-speed range, and in the upper load/engine-speed range adjustment of the variable turbine geometry is performed by means of closed-loop control as a function of the characteristic map assigned to the upper load/engine-speed range.

10 Claims, 3 Drawing Sheets

METHOD FOR REGULATING OR CONTROLLING A SUPERCHARGED INTERNAL COMBUSTION ENGINE

BACKGROUND AND SUMMARY OF THE INVENTION

This application claims the priority of German Patent Document 198 44 213.0 filed in Germany on Sep. 26, 1998 and PCT/EP99/06343 filed in Europe on Aug. 28, 1999.

The invention relates to a method for the closed-loop or open-loop control of a forced-induction internal combustion engine.

German Reference DE 40 25 901 C1 has disclosed an exhaust turbocharger for an internal combustion engine that has a turbine with a turbine geometry that can be varied by means of variable turbine guide vanes and a compressor driven by the turbine for increasing the boost pressure in the cylinder inlet. The turbine guide vanes can be adjusted by an actuator so that the effective turbine cross section of the turbine is modified. This makes it possible to achieve different exhaust backpressures in the section between the cylinders and the exhaust turbocharger, depending on the operating state of the internal combustion engine, thereby allowing the output of the turbine and the output of the compressor to be adjusted according to requirements. The turbine guide vanes are adjusted to a desired boost pressure in accordance with specified characteristics.

In order to achieve an improvement in efficiency in a simple manner during nonsteady-state operation of the internal combustion engine, boost-pressure control is performed in accordance with different characteristics above and below a threshold value for the exhaust backpressure. This makes it possible to prevent the occurrence of uncontrolled increases in pressure in the exhaust line upstream of the turbine while the boost pressure is still rising after a positive load change. The internal combustion engine no longer has to expel the exhaust against an increased exhaust backpressure and efficiency is increased.

Another method for closed-loop control of the boost pressure is known from German Reference DE 195 31 871 C1. In order to improve efficiency during nonsteady-state operation of the internal combustion engine, especially after a positive load change from low load and engine-speed ranges, this publication proposes to determine the difference between the exhaust backpressure and the boost pressure as the controlled variable for closed-loop control in order to adjust the boost pressure. This makes it possible to detect an impermissibly high deviation in the exhaust backpressure in the case of a positive load change and to correct it by suitable measures. measures.

The problem underlying the invention is to optimize the operating behaviour of the engine over all load and engine-speed ranges.

According to the invention, open-loop control is exercised in the lower load/engine-speed range and closed-loop control is exercised in the upper load/engine-speed range. The division into an upper and a lower load/engine-speed range with the respectively assigned characteristic maps has the advantage that it is possible to decide, by comparison with a defined specifiable limiting value, whether open-loop or closed-loop control should be performed. By distinguishing between open-loop and closed-loop control, it is possible to follow an optimum strategy appropriate to the respective operating situation while allowing for partially contradictory aims. By switching between closed-loop and open-loop control according to requirements, the operating behaviour of the internal combustion engine can be optimized with regard to fuel consumption and dynamic response.

In the lower load/engine-speed range, rapid adjustment of the variable turbine geometry without delay is possible owing to the directness of control, thereby improving response. A further advantage is that open-loop control is not dependent on the pressure conditions in the exhaust line or in the intake section, making it possible to eliminate external influences, e.g. falling atmospheric pressure in operation at altitude, and to set the same position of the turbine geometry under all conditions. In the lower load/engine-speed range, a characteristic map incorporating the positions for the turbine geometry is expediently specified. Closed-loop control, which would be problematic in any case owing to the low energy potential because, in the low-pressure range, the boost pressure is almost independent of the exhaust backpressure and consequently independent of the position of the variable turbine geometry, is not required.

Open-loop control also has advantages in terms of fuel consumption compared with closed-loop adjustment in the lower load/engine-speed range. Open-loop specification of the turbine's position avoids a situation where the turbine geometry is moved into the pressure build-up position and the exhaust backpressure upstream of the turbine is increased. This avoids the need to increase fuel injection to allow the exhaust to be expelled into the exhaust line against the exhaust backpressure.

In the upper load/engine-speed range, on the other hand, the pressure level is higher, favouring closed-loop control and thus also allowing changing external influences to be taken into account. At this pressure level, the boost pressure rises steeply as a function of the actuating travel of the turbine geometry, so that even small changes in the actuating travel lead to a large change in the boost pressure. In this case, open-loop control would be too inaccurate because dimensional inaccuracies due to wear, thermal expansion and forced-induction would lead to an impermissibly large deviation from the desired value. Closed-loop control can compensate for such inaccuracies.

In addition to the possibility of optimizing the characteristic maps for the different ranges with regard to the criteria of fuel consumption and dynamic response, further distinguishing features, such as a steady-state/nonsteady-state engine operating state, can furthermore be taken into account and additional characteristic maps can be assigned to these operating states, thus not only allowing a distinction to be drawn between the upper and the lower load/engine-speed range with the associated characteristic maps but also further characteristic maps to be taken into account in accordance with the additional criteria.

In a preferred embodiment, the position of the variable turbine geometry is stored as a function of load and engine speed in the associated characteristic map in the lower load/engine-speed range. For this purpose, either the position of the turbine geometry or actuating-signal values that are fed to the actuator acting upon the turbine geometry can be specified.

For closed-loop control in the upper load/engine-speed range, desired boost-pressure values are preferably specified as a function of the load and engine speed. For closed-loop control, the position of the variable turbine geometry is varied until the actual boost-pressure values coincide with the desired values.

As an alternative, closed-loop control can also be performed by way of the engine speed. In this case, desired engine-speed values are stored in the characteristic map as a function of the load and compared with actual engine-speed values. Setting of the desired values is performed by varying the position of the turbine geometry in a similar manner to that for boost-pressure control.

BRIEF DESCRIPTION OF THE DRAWINGS

Further advantages and expedient embodiments can be taken from the further claims, the description of the figures and the drawings, in which:

DETAILED DESCRIPTION OF THE PREFERRED EMBODIMENTS

Figure 1A:
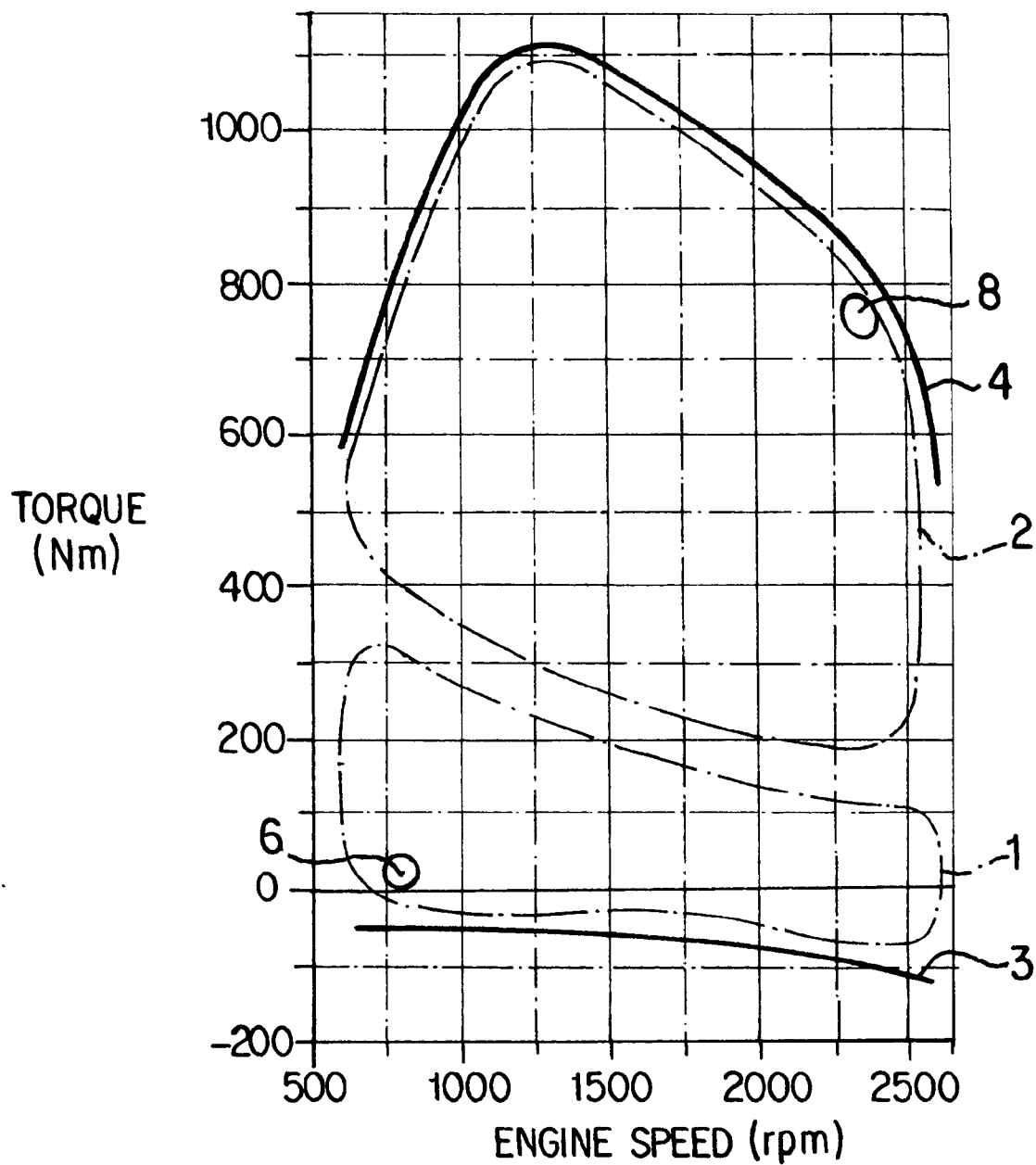
FIGS. 1a–1c shows an engine-speed/torque diagram with different ranges for closed-loop and open-loop control and associated boost-pressure characteristics.

In the engine-speed/torque diagram illustrated in the FIG. 1a, two ranges 1, 2 have been plotted, corresponding to different load/engine-speed ranges involving a different strategy for the adjustment of the variable turbine geometry (VTG) of a forced-induction internal combustion engine. A limiting value can be specified for the load and/or engine speed to differentiate between the lower and the upper load/engine-speed range. The currently applicable load/engine-speed range can be identified by means of an engine parameter—expediently the current load or engine speed in the unit corresponding to the limiting value. Each load/engine-speed range is assigned a characteristic map. If the engine parameter undershoots or exceeds the limiting value specified, the system switches to the other load/engine-speed range with the respectively associated characteristic map. Either the load or the engine speed or a combination of load and engine speed can be used as the limiting value or engine parameter.

In the lower range 1, which corresponds to the lower load/engine-speed range, the VTG is subjected to open-loop control in accordance with a characteristic map assigned to this range, in which flap positions are stored as a function of load and engine speed when a flap-type turbine is used. In the upper range 2, which corresponds to the upper load/engine-speed range, the boost pressure is subjected to closed-loop control in accordance with a characteristic map in which desired boost-pressure values are stored as a function of load and engine speed. The torque variation is limited at the bottom by a minimum curve 3 and at the top by a maximum curve 4.

Figure 1B:
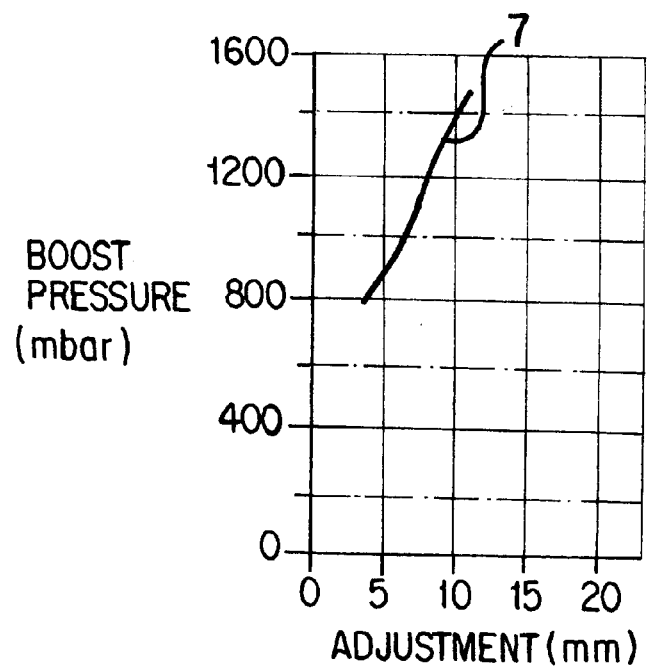
Figure 1C:
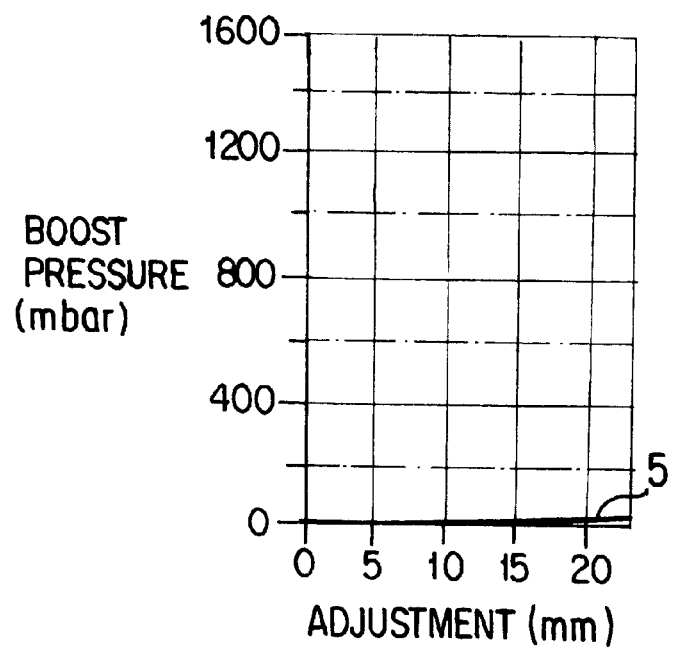

The lower range 1 is assigned a boost-pressure curve 5 from FIG. 1c, which represents the variation of the boost pressure as a function of the adjustment of the VTG at an arbitrarily chosen operating point 6 within range 1. Given a small adjustment, the VTG is in its open position, in which the effective turbine cross section is reduced to only a minimal extent, if at all. In the maximum adjustment range, the VTG is in its pressure build-up position, in which the effective turbine cross section is reduced to the greatest possible extent.

Within the lower range 1, the boost pressure rises only slightly, in accordance with the boost-pressure curve 5 plotted, as the adjustment of the VTG increases, there being virtually no dependence between the boost pressure and the adjustment of the VTG, with the result that closed-loop control of the boost pressure through adjustment by means of the VTG would have little effect, if any, in this range. In the lower range 1, open-loop control of the VTG is therefore carried out in accordance with the characteristic map assigned to this range.

In the upper torque range 2, the operating point 8 plotted is assigned a boost-pressure curve 7 as a function of the adjustment of the VTG in accordance with the FIG. 1b. The boost-pressure curve 7 rises steeply as a function of the adjustment. In this range, closed-loop control of the boost pressure is carried out to enable the actual value of the boost pressure to be matched precisely to the desired value and to allow deviations caused by dimensional inaccuracies, wear, expansion etc. to be compensated for.

Instead of closed-loop control of the boost pressure, it is also possible to carry out closed-loop control of an engine-operating or state variable that exhibits linear or non-linear dependence on the boost pressure. In particular, it is possible to employ closed-loop control of the speed of the charger, in which case desired values for the speeds of the charger are specified as a function of the load and/or engine speed as the upper characteristic map.

A turbine with an axial slide, a turbine with radial guide vanes or a flap-type turbine can be used to give the VTG.

Figure 2:
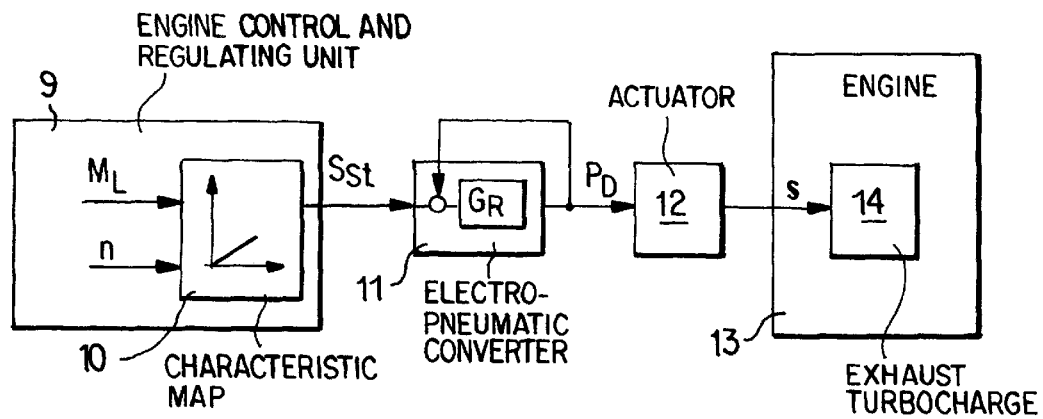
FIG. 2 shows a block diagram of an open-loop control system for the variable turbine geometry.

FIG. 2 shows a device, illustrated as a block diagram, for open-loop control of the VTG in the lower load/engine-speed range. Stored in an engine control and regulating unit 9 is a first characteristic map 10, in which values for the positions of the VTG or values corresponding to these positions are stored as a function of the engine load $M_L$ and the engine speed n. The engine load $M_L$ and the engine speed n are applied as input signals to the engine control and regulating unit 9, and, as an output signal, the control and regulating unit 9 supplies a pulse-width-modulated actuating signal $S_{St}$, which is fed as an input signal to an electropneumatic converter 11, which produces a control pressure $p_D$ as an output signal. Underlying the converter 11 there can be a controller $G_R$, which is allocated the task of compensating for fluctuations in the supply pressure to the internal combustion engine, ensuring that such fluctuations do not impact upon the control pressure $p_D$ generated.

The control pressure $p_D$ is fed to the actuator 12 of the VTG as an input pressure, and, in accordance with the control pressure $p_D$ applied, this produces an actuating travel s, which is applied to the VTG of the exhaust turbocharger 14 of the engine 13.

Figure 3:
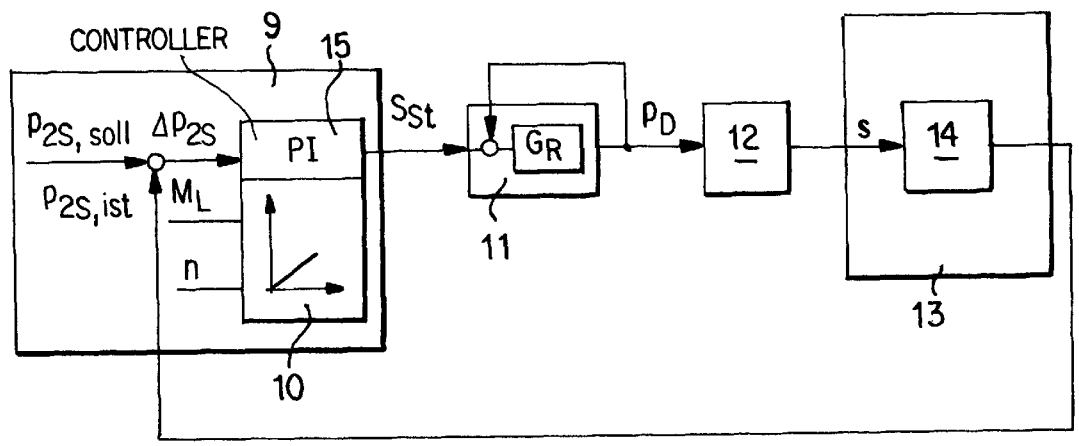
FIG. 3 shows a block diagram of a closed-loop control system for the boost pressure.

FIG. 3 shows a device, illustrated as a block diagram, for closed-loop control of the boost pressure in the upper load/engine-speed range. The engine control and regulating unit 9 includes not only the characteristic map 10 assigned to the upper load/engine-speed range but also a controller 15, which is embodied as a PI controller in the exemplary embodiment shown. Desired boost-pressure values $p_{2S,soll}$ are stored in the characteristic map 10 as a function of load and engine speed. As a function of the input signals $M_L$ for the engine load and n for the engine speed, the desired boost-pressure values $p_{2S,soll}$ are compared with actual boost-pressure values $p_{2S,ist}$, which are detected in the engine 13 and are fed to the control and regulating unit 9. The difference $\Delta p_{2S}$ between the desired boost-pressure value and the actual value is fed to the controller 15, in which the actuating signal $S_{St}$ is produced as a pulse-width-modulated output signal in accordance with the given control algorithm. Subsequently, the actuating signal $S_{St}$ is fed to the converter 11 in a corresponding manner to that for open-loop control in FIG. 2, and, if appropriate, is subjected to pressure regulation in the controller $G_R$, and the control pressure $p_D$ produced is fed to the actuator 12. The actuating travel s of the actuator 12 is then applied to the VTG of the exhaust turbocharger 14.

The method described can be used both for forced-induction internal combustion engines for commercial vehicles and for passenger cars. The method can be employed for spark-ignition and diesel engines.

It is also possible to use functions instead of characteristic maps.

It may be expedient to distinguish between not just two but a plurality of load/engine-speed ranges and to assign each load/engine-speed range a characteristic map. It is furthermore possible to take account of other operating modes, such as steady-state/nonsteady-state operation and to specify characteristic maps matched to each operating mode. The method is preferably employed in the powered driving operating mode but it may also be expedient to exercise open-loop or closed-loop control in engine braking mode in various indicated operating states.

What is claimed is:

1. A method for a closed-loop or an open-loop control of a forced-induction combustion engine including an exhaust turbo charger with an exhaust turbine having variable turbine geometry for the variable adjustment of the effective turbine cross-section and having a boost-air compressor with different operating states of the engine being assigned different characteristic maps with at least one of engine-operating and engine-state variables and wherein the turbine geometry is adjusted as a function of the characteristic maps between an open position and a pressure buildup position and when there is a change in a significant engine parameter, the systems switching between two characteristic maps, said method comprising the steps of:

defining two load/engine-speed ranges with one of said speed ranges being above and one being below a predetermined limiting value and wherein each of said two load-engine speed ranges is assigned an associated characteristic map;

identifying the current load/engine-speed range by means of an engine parameter;

performing adjustment of the variable turbine geometry where said current load/engine speed range is below said predetermined limiting value by the open-loop control as a function of the associated characteristic map of the load/engine-speed range below said predetermined limiting value; and adjusting of the variable turbine geometry when said current load/engine speed range is above said predetermined limiting value by the closed-loop control as a function of the associated characteristic map of the load/engine-speed range above said predetermined limiting value.

2. The method according to claim 1, wherein positions of the variable turbine geometry are stored in the associated characteristic map of the load/engine-speed range below said predetermined limiting value.

3. The method according to claim 2, wherein the closed-loop control of the boost pressure is performed in the load/engine speed range above said predetermined limiting value and desired boost-pressure-values are stored in the associated characteristic map of the load/engine-speed range above said predetermined limiting value.

4. The method according to claim 2, wherein the closed-loop control of the speed of the exhaust turbo charger is performed in the load engine-speed range above said predetermined limiting value and wherein desired charger-speed values are stored in the associated characteristic map.

5. The method according to claim 1, wherein values for actuating signals for an actuator operating on the variable turbine geometry are stored in the associated characteristic map of the load/engine-speed range below said predetermined limiting value.

6. The method according to claim 5, wherein the closed-loop control of the boost pressure is performed in the load/engine speed range above said predetermined limiting value and desired boost-pressure-values are stored in the associated characteristic map of the load/engine-speed range above said predetermined limiting value.

7. The method according to claim 5, wherein the closed-loop control of the speed of the exhaust turbo charger is performed in the load engine-speed range above said predetermined limiting value and wherein desired charger-speed values are stored in the associated characteristic map.

8. The method according to claim 1, wherein the closed-loop control of the boost pressure is performed in the load/engine speed range above said predetermined limiting value and desired boost-pressure-values are stored in the associated characteristic map of the load/engine-speed range above said predetermined limiting value.

9. The method according to claim 1, wherein the closed-loop control of the speed of the exhaust turbo charger is performed in the load engine-speed range above said predetermined limiting value and wherein desired charger-speed values are stored in the associated characteristic map.

10. A method for a closed-loop or an open-loop control of an engine braking mode of a forced-induction combustion engine including an exhaust turbo charger with an exhaust turbine having variable turbine geometry for the variable adjustment of the effective turbine cross-section and having a boost-air compressor with different operating states of the engine being assigned different characteristic maps with at least one of engine-operating and engine-state variables and wherein the turbine geometry is adjusted as a function of the characteristic maps between an open position and a pressure buildup position and when there is a change in a significant engine parameter, the systems switching between two characteristic maps, said method comprising the steps of:

defining two load/engine-speed ranges with one of said speed ranges being above and one being below a predetermined limiting value and wherein each of said two load-engine speed ranges is assigned an associated characteristic map;

identifying the current load/engine-speed range by means of an engine parameter;

performing adjustment of the variable turbine geometry where said current load/engine speed range is below said predetermined limiting value by the open-loop control as a function of the associated characteristic map of the load/engine-speed range below said predetermined limiting value; and adjusting of the variable turbine geometry when said current load/engine speed range is above said predetermined limiting value by the closed-loop control as a function of the associated characteristic map of the load/engine-speed range above said predetermined limiting value.

* * * * *